Aug. 25, 1925.

J. T. FULLER 1,550,898

INSECT GATHERING MACHINE

Filed Aug. 31, 1923    2 Sheets-Sheet 1

INVENTOR
J. T. Fuller
BY
ATTORNEY

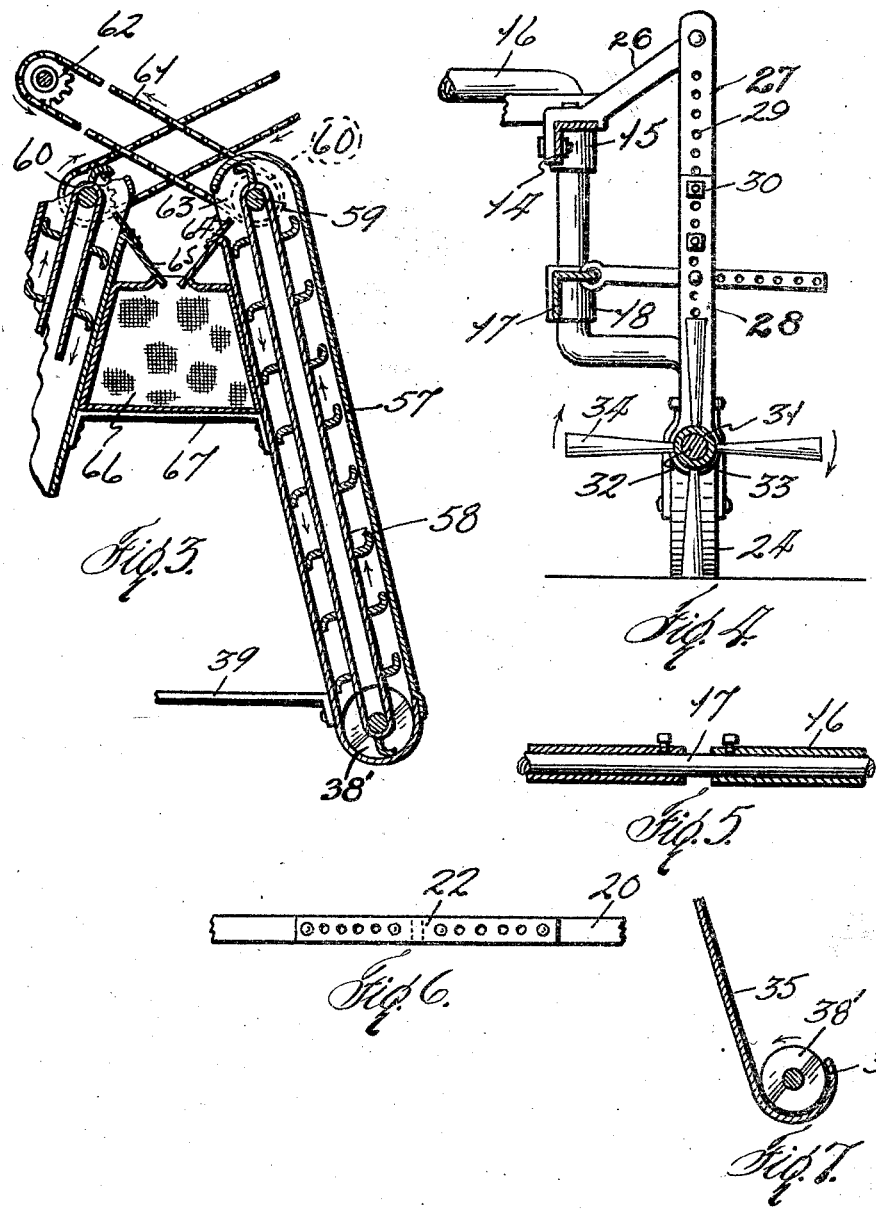

Patented Aug. 25, 1925.

1,550,898

UNITED STATES PATENT OFFICE.

JAMES T. FULLER, OF DALLAS, TEXAS.

INSECT-GATHERING MACHINE.

Application filed August 31, 1923. Serial No. 660,304.

*To all whom it may concern:*

Be it known that I, JAMES T. FULLER, citizen of the United States of America, residing at Dallas, in the county of Dallas and State of Texas, have invented certain new and useful Improvements in Insect-Gathering Machines, of which the following is a specification.

This invention relates to new and useful improvements in insect gathering machines.

The object of the invention is to provide an improved machine having revolving brushes for dislodging the insects from the plants and casting them into conveyors which carry them to elevators and the latter deposit them in a receptacle.

An advantage of such a combination is that the insect is kept constantly moving from the time it is dislodged until it is deposited in the receptacle and thus the insect is not given an opportunity to fly away.

A construction designed to carry out the invention will be hereinafter described together with other features of the invention.

Figure 1:
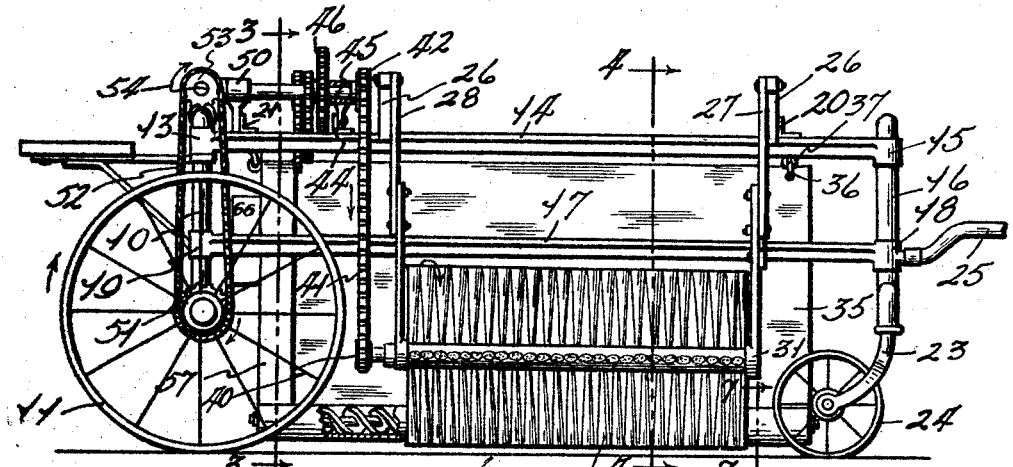
Figure 2:
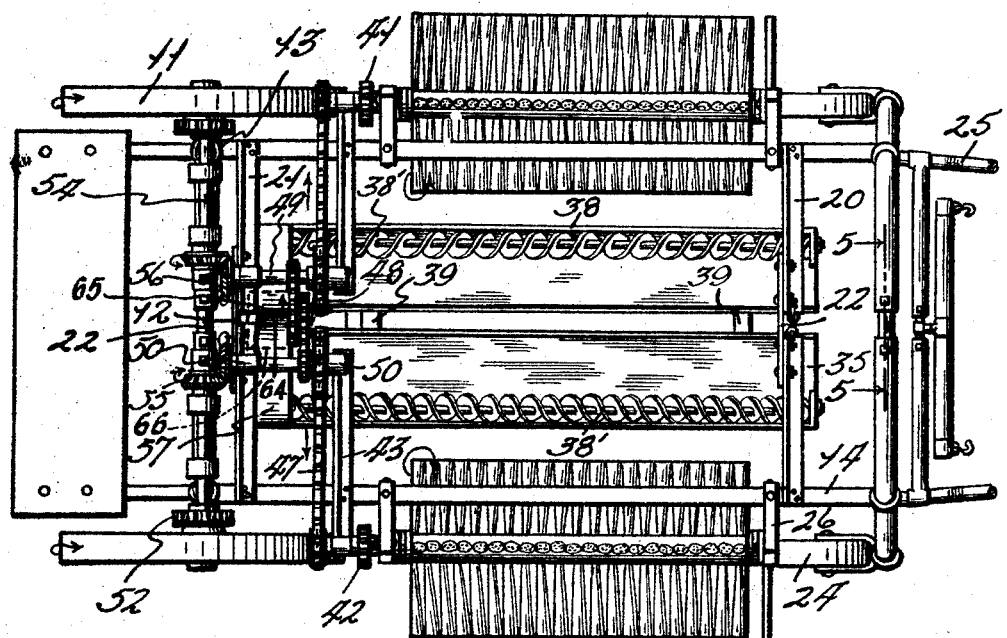

The invention will be more readily understood from a reading of the following specification and by reference to the accompanying drawings, in which an example of the invention is shown, and wherein:

Fig. 1 is a side elevation of a machine constructed in accordance with my invention, Fig. 2 is a plan view of the same, Fig. 3 is an enlarged sectional view of the elevators taken on the line 3—3 of Fig. 1, Fig. 4 is an enlarged sectional view taken on the line 4—4 of Fig. 1, Fig. 5 is an enlarged sectional view taken on the line 5—5 of Fig. 2, Fig. 6 is an enlarged detail of the cross-connection for the frame, and Fig. 7 is an enlarged transverse sectional view through one of the troughs.

In the drawings the numeral 10 designates an arch axle which is supported in ground wheels 11. The axle is split at its center and has an extension bar 12 telescoping into its sections and suitably fastened, whereby the axle and ground wheels may be adjusted to rows spaced at different distances. On the upright of each axle is fastened a collar 13 which has secured thereto, the rear end of a top and side frame bar 14.

The frame bars extend forwardly and are secured to collars 15 fastened in the uprights of the front axle 16. The front axle is also split and has an extension bar 17 (Fig. 5) telescoping into its sections, like the axle 10. Side brace bars 17 below the bars 14 extend from collars 18 on the front axle to collars 19 on the rear axle. Angular cross bars 20 extend across the front of the frame while similar bars 21 extend across the rear of the frame. The bars are split into pairs united by cross-connecting bars 22 (Fig. 6) adjustably bolted thereto. The frame can be adjusted transversely by means of the bars 12, 17 and 22.

The front axle has angular legs 23 extending laterally therefrom and in the lower ends of which follower wheels 24 are mounted to track the wheels 11. A suitable draft connection 25 is attached to the front axle. Upwardly and outwardly inclined hanger brackets 26 are mounted on the frame bars 14. Overlapping hanger bars 27 and 28 are suspended from the outer ends of the brackets. The bars 27 and 28 have spaced bolt holes 29 which register when the bars are overlapped and which receive bolts 30 for fastening the bars together (Fig. 1). The bars 28 have journal boxes 31 at their lower ends.

In each pair of boxes 31 on each side of the frame is journaled a beater shaft 32. On each shaft is mounted a suitable arbor 33 holding vanes of bristles 34. By adjusting the bars 27 and 28, the beaters may be raised or lowered to suit the height of the plants.

Upwardly inclined aprons 35 have their top edges equipped with rings 36 and extend longitudinally under the frame. The rings engage eye bolts 37 in the inner ends of the cross-bars 20 and 21, whereby said aprons are suspended to swing laterally. The lower ends of the aprons are spread apart and braced by spreader bars 39. In each trough is mounted a screw conveyor 38' of the proper form to convey the insects rearwardly in the trough.

On the rear end of each beater shaft is mounted a sprocket wheel 40 around which is engaged the lower end of a sprocket chain 41 having its upper end supported on a sprocket wheel 42. The sprocket chains 41 are of the usual detachable link type commonly used on farm implements and may be lengthened or shortened. Transverse angle bars 43 are mounted on the bars 14 and support bearing brackets 44 on their outer ends. The bearing brackets support counter shafts 45 (Fig. 1) on which are mounted sprocket wheels 46. The sprocket wheels 46 are driven by chains 47 from wheels 48 mounted on the forward ends of jack shafts 49 supported by brackets 50 mounted on the bars 21 and 43. The ground wheels 11 carry sprocket wheels 51 driving chains 52 having their upper ends passing around wheels 53. The sprocket wheels are mounted on the outer ends of transverse drive shafts 54. On the inner end of each drive shaft is mounted a miter gear 55 meshing with a miter gear 56 mounted on the rear end of the adjacent jack shaft. The drive shafts are suitably mounted on the rear axle.

At the rear ends of the aprons and troughs are elevator legs 57 having elevators 58 therein. Each elevator has a shaft 59 at its upper end extending through the leg and carrying a sprocket wheel 60 which is driven by a chain 61 (Fig. 3). The chains are driven by wheels 62 on the shafts 49, and these chains are crossed, the right hand wheel 62 driving the wheels 60 of the left hand elevator and vice versa. This is done to impart the desired movement to the elevator.

Each leg has a discharge opening 63 on its inner side at its head and a flexible lip 64, of leather or other material is wiped by the elevators, whereby the insects are deflected on downwardly inclined slides 65 into a receptacle 66 removably supported on a shelf 67 between the legs 57.

In operation the machine is drawn along the rows, the plants passing between the beaters 34 and the aprons 35. The ground wheels drive the parts in the directions shown by the arrows, whereby the beaters are turned toward the plants and knock insects against the aprons, from which they slide down into the troughs 38. The conveyors 38' carry the insects rearwardly to the elevators 58 which take them up and discharge them into the receptacle 66. A suitable clutch (not shown) may be included at any convenient place for interrupting the transmission of motion when it is not desired.

Various changes in the size and construction of the parts as well as modifications, may be made within the scope of the appended claims.

What I claim, is:

1. In an insect gathering machine, the combination of a wheel supported frame, logitudinal inclined aprons carried by the frame, conveyor troughs at the bottom of the aprons, conveyors in the troughs, elevators at the rear ends of the troughs, and revolving beaters opposite the aprons and parallel thereto.

2. In an insect gathering machine, the combination of a wheel supported frame, longitudinal inclined aprons suspended from the frame, revolving beaters opposite and parallel to the aprons, means for adjusting the beaters to different elevations, conveyor troughs at the lower ends of the aprons, conveyors in the troughs, and elevators at the rear ends of the troughs.

3. In an insect gathering machine, the combination of a wheel supported frame, longitudinal inclined aprons suspended from the frame, revolving beaters opposite and parallel to the aprons, means for adjusting the beaters to different elevations, conveyor troughs at the lower ends of the aprons, conveyors in the troughs, elevators at the rear ends of the troughs, and a removable receptacle receiving the insects from the elevators.

4. In an insect gathering machine, the combination of a wheel supported frame, of diverging inclined aprons suspended longitudinally of the frame, troughs at the lower edges of the aprons, screw conveyors in the troughs, hangers transversely of the frame, revolving beaters mounted in the hangers, bucket elevators at the rear ends of the troughs, and means for driving the conveyors, beaters and elevators.

5. In an insect gathering machine, the combination of a wheel supported frame, of diverging inclined aprons suspended longitudinally of the frame, troughs at the lower edges of the aprons, screw conveyors in the troughs, hangers transversely of the frame, revolving beaters mounted in the hangers, bucket elevators at the rear ends of the troughs, means for driving the conveyors, beaters and elevators, discharge means at the upper ends of the elevators and a receptacle at the lower ends of the discharge means.

In testimony whereof I affix my signature.

JAMES T. FULLER.